US012751474B2

(12) United States Patent
Riess et al.

(10) Patent No.: US 12,751,474 B2
(45) Date of Patent: Oct. 6, 2026

(54) COMPOSITIONS FOR SOUR TASTE BALANCING

(71) Applicant: SYMRISE AG, Holzminden (DE)

(72) Inventors: Thomas Riess, Holzminden (DE); Tom Somers, Holzminden (DE); Jens Fahle, Heinade (DE); Katharina Reichelt, Holzminden (DE); Jakob Ley, Holzminden (DE); Susanne Paetz, Höxter (DE); Rebecca Wiebusch, Holzminden (DE)

(73) Assignee: SYMRISE AG, Holzminden (DE)

( * ) Notice: Subject to any disclaimer, the term of this patent is extended or adjusted under 35 U.S.C. 154(b) by 371 days.

(21) Appl. No.: 18/260,625

(22) PCT Filed: Jan. 8, 2021

(86) PCT No.: PCT/EP2021/050223
§ 371 (c)(1),
(2) Date: Jul. 7, 2023

(87) PCT Pub. No.: WO2022/148540
PCT Pub. Date: Jul. 14, 2022

(65) Prior Publication Data

US 2024/0292874 A1 Sep. 5, 2024

(51) Int. Cl.
*A61K 31/12* (2006.01)
*A23L 27/00* (2016.01)
*A23L 27/20* (2016.01)

(52) U.S. Cl.
CPC ............. *A23L 27/88* (2016.08); *A23L 27/204* (2016.08); *A23L 27/84* (2016.08)

(58) Field of Classification Search
CPC ......... A23L 27/88; A23L 27/204; A23L 27/84
USPC .......................................................... 426/538
See application file for complete search history.

(56) References Cited

U.S. PATENT DOCUMENTS

| | | | |
|---|---|---|---|
| 10,702,484 | B2 | 7/2020 | Krammer et al. |
| 11,819,044 | B2 | 11/2023 | Delattre et al. |
| 2019/0289886 | A1 | 9/2019 | Kiefl et al. |

(Continued)

FOREIGN PATENT DOCUMENTS

| | | | |
|---|---|---|---|
| EP | 2353403 A1 | 8/2011 |
| JP | 2019501648 A | 1/2019 |
| JP | 2019502390 A | 1/2019 |

(Continued)

OTHER PUBLICATIONS

Japanese Office Action and English translation issued on Jan. 28, 2025 for corresponding Japanese Application No. 2023-541341.

(Continued)

*Primary Examiner* — Brent T O'Hern
(74) *Attorney, Agent, or Firm* — POLSINELLI PC

(57) ABSTRACT

The invention relates to an aroma composition comprising at least one taste modifier having the general formula I or a salt thereof, a semi-finished product comprising such an aroma composition, a finished product comprising such an aroma composition and/or such a semi-finished product, the use of at least one specific taste modifier and a method for improving the sweet/sour balance and/or reducing the sweet/sour imbalance and/or improving the mouthfeel in a preparation.

19 Claims, 10 Drawing Sheets

(56) References Cited

U.S. PATENT DOCUMENTS

2019/0343777 A1* 11/2019 Krammer ................ A23L 27/86

FOREIGN PATENT DOCUMENTS

| | | | |
|---|---|---|---|
| JP | 2019514346 | A | 6/2019 |
| WO | 2017092796 | A1 | 6/2017 |
| WO | 2017125518 | A1 | 7/2017 |
| WO | 2017186299 | A1 | 11/2017 |
| WO | 2018017574 | A1 | 1/2018 |

OTHER PUBLICATIONS

International Search Report and Written Opinion issued on Sep. 22, 2021 for corresponding PCT Application No. PCT/EP2021/050223.

* cited by examiner

COMPOSITIONS FOR SOUR TASTE BALANCING

CROSS-REFERENCE TO RELATED APPLICATIONS

This application is a national stage application (under 35 U.S.C. § 371) of PCT/EP2021/050223, filed Jan. 8, 2021, which is incorporated herein by reference in its entirety.

SUMMARY OF THE DISCLOSURE

The invention relates to an aroma composition comprising at least one taste modifier having the general formula I or a salt thereof, a semi-finished product comprising such an aroma composition, a finished product comprising such an aroma composition and/or such a semi-finished product, the use of at least one specific taste modifier and a method for improving the sweet/sour balance and/or reducing the sweet/sour imbalance and/or improving the mouthfeel in a preparation.

Food or beverages often contain various unpleasant-tasting substances, such as strong acidic substances. These substances provide a (strong) sour taste of the food or beverage, which may be desirable in some cases (e.g. fruit or edible acids in sweetjuices or refreshing drinks). However in many cases, this strong sour taste is not desired or accepted by consumers and is typically attenuated or masked by a sweet taste conveyed by diverse sweetening substances.

Sour taste is caused by proton acids. In this case, the so-called titratable proton concentration is more important for the acid impression than the pH: for example, a hydrochloric acid solution having the same pH value as a malic acid solution tastes significantly less acidic in comparison. Classically, the unpleasant acid taste is greatly mitigated by combination with sweet flavours, especially sugar. In this case, however, regularly sweet-tasting substances (for example, sweeteners) have to be used in comparatively high concentrations, i.e. usually in an amount, which would correspond to at least 2 wt.-% aqueous sucrose solution (sucrose solution).

Likewise, foods (nourishment, including beverages) or semi-luxury foods which have a high sugar content (primarily sucrose, lactose, glucose or fructose or mixtures thereof) are usually strongly preferred by consumers owing to their sweetness.

Simultaneously, it is generally known that a high content of easily metabolisable carbohydrates allows the blood sugar level to strongly increase, leads to the formation of fatty de-posits and can ultimately lead to health problems, such as excess weight, obesity, insulin resistance, late-onset diabetes and their secondary diseases. In particular there is also the aggravation that many of the above-mentioned carbohydrates can also affect dental health as they are broken down by specific types of bacteria in the oral cavity, e.g. into lactic acid, and can attack the tooth enamel of adolescent or adult teeth (e.g. causing cavities). It has therefore long been the aim and policy to reduce the sugar content of foods and/or semi-luxury foods to the absolutely necessary amount.

The negative impact of this approach is that the acid-masking effect as described above is negatively influenced by reducing the sugar contents in the targeted products. Consequently, the balance of sweet and sour perception in these products is disturbed, which appears as unpleasant and imbalanced to consumers. This also applies to products, in which a sour taste impression is desired, as described above, as also in these products, the sour taste is perceived as unpleasant if it becomes too strong.

A reduction of the components evoking the acidic taste would presumably restore the balance. However, in a large number of cases, such as foods derived from sweet and sour fruits or vegetables (e.g. fruit juices, fruit preparations and foodstuffs made therefrom) and products made by fermentation using acid-producing microorganisms (e.g. yoghurt, ghee, kefir, soy yoghurt, Sauerkraut, sourdough bread, sausages, sour milk, cheese, mixed pick-les, lactobionic acid or glucuronic acid-containing soft drinks), the amount of acids is necessary to produce the microbial stability of the product. Thus, it is usually not possible to simply reduce the amount of the components evoking the acidic taste.

The same also applies to compositions and semi-finished products, which are processed into such foods and semi-luxury foods.

Typically, in the state of the art, the acidic taste, which is intensified by reducing sweet tasting sugar components as described above, is masked or reduced by artificially increasing the sweet taste impression with one or more sweeteners. These are chemically uniform substances, which do not themselves have a calorific value, or have only a very low calorific value, and simultaneously give a strong sweet taste impression. The substances are usually non-cariogenic (overview: Valerie B. Duffy, Madeleine Sigman-Grant, Margaret A. Powers, Denise Elmore, Esther F. Myers, Diane Quagliani, Marie Spano, Kimberly F. Stitzel, Sue Taylor, Robert Earl and Sonja Connor, Journal of the American Dietetic Association 2004, 104 (2), 255-275). Some of these are known as bulk sweeteners, such as sorbitol, mannitol or other sugar alcohols, which are outstanding sweeteners and can also partially replace the remaining food technology-related properties of sugars, but too frequent intake leads to osmotically-induced digestion problems among some people. While, owing to their low concentration in use, the non-nutritive, highly intensive sweeteners are very suitable for bringing sweetness into foods, however they often exhibit taste-related problems as a result of time-intensity profiles which are not similar to sugar (e.g. sucralose, stevioside, cyclamate), a bitter and/or astringent aftertaste (e.g. acesulfame K, saccharin), or pronounced additional flavour impressions (e.g. glycyrrhetinic acid ammonium salt). Some of the sweeteners are not particularly stable as regards heat (e.g. thaumatin, brazzein, monellin), are not stable in all applications (e.g. aspartame) and are sometimes very long-lasting in terms of their sweet effect (strong sweet aftertaste, e.g. saccharin).

An improvement in the taste properties, in particular the aftertaste problem of non-nutritive, highly intensive sweeteners, can be achieved by the use of tannic acid, e.g. as described in WO 98/20753, or phenolic acids as in U.S. Pat. No. 3,924,017. However, substances of this type are not particularly stable in applications owing to their catechol units.

A further possibility—without using non-nutritive sweeteners—consists in reducing the sugar content of food and/or semi-luxury foods and adding sensorially weak or imperceptible substances which indirectly or directly enhance the sweetness, as described for example in WO 2005/041684. The substances described in WO 2005/041684 are, however, explicitly of non-natural origin and are therefore more difficult to assess from a toxicological perspective than substances of natural origin and need to be declared as such on the product's ingredient list, in particular if the latter occur in foods or semi-luxury foods or originate from raw materials for obtaining foods or semi-luxury foods.

EP 1 291 342 A1 describes non-nutritive sweeteners of natural origin (pyridinium betaines). However, they do not selectively affect the sweet taste, as rather other tastes, such as savouriness or saltiness, are affected. In addition, the disclosed substances can only be purified with high expenditure.

Thus, by using the sweeteners, the sweet taste impression is such strong, that the consumers no longer perceive the sour taste impression, at least in an unpleasant manner. However, it is often difficult to find the correct amount of sweeteners to perfectly balance the sweet and sour taste impressions. Typically, the sweeteners need to be added in huge amounts to mask or reduce the sour taste impression. However, in these amounts, the sweeteners themselves cause a negative, usually bitter, taste impression, as described above. Furthermore, such a high amount of sweeteners is often not applicable, for example in products, in which such a strong sweet taste impression is not desired.

It was therefore the primary object of the present invention to provide aroma compositions, which can mask and/or reduce the acidic taste impression of compounds, also in preparations, in particular in foodstuffs and pharmaceuticals, preferably without influencing the desired taste impression of these preparations.

DETAILED DESCRIPTION

Figure 1:
FIG. 1 shows the sensory evaluation of Example 1, demonstrating reduced acidity and minimal sweetness impact when using aroma compositions according to the invention.

The primary object of the present invention is achieved by an aroma composition, wherein the aroma composition comprises at least one taste modifier having the general formula I or a salt thereof, (I)

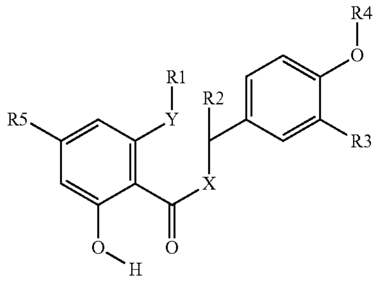

wherein

X and Y denote independently of each other —$CH_2$— or O, wherein either

X=—$CH_2$— and Y=O, or

X=O and Y=—$CH_2$—, under the provision that if X=—$CH_2$— and Y=O, R1 and R2 together represent a single bond or R1=Hand R2=H, and if X=—O— and Y=—$CH_2$—, R1 and R2 together represent a single bond, R3 denotes —H or —OH, R4 denotes —H or —$CH_3$, preferably wherein R3 and R4 denote —H, or R3 denotes —OH and R4 denotes —$CH_3$, and R5 denotes —H, —OH or —O-glucopyranoside, preferably —H, —OH or —O-beta-D-glucopyranoside, wherein the total amount of the at least one taste modifier in the aroma composition is such that the at least one taste modifier provides no sweetness impression or a sweetness impression of less than 1.5% sucrose equivalents in the aroma composition, and such that the total amount of the at least one taste modifier is not sufficient to enhance the sweetness of a/another sweet tasting substance in the aroma composition, if present.

The term "R1 and R2 together represent a single bond" is meant to be understood such that the Y in formula (I), which is connected to R1, and the carbon atom in formula (I), which is connected to R2, together are connected with a single bond and thus form part of a closed 6-membered ring structure, further including X and the 3 further carbon atoms.

It was surprisingly found that balancing the acidic taste impressions by adding the taste modifiers according to formula (I) in a concentration, in which the taste modifiers themselves do not provide a sweet taste or only a sweet taste, which is below 1.5% sucrose equivalents, has been particularly advantageous in masking and/or reducing. This is in contrast to the procedures in the prior art, in which the acidic taste impressions are masked by (strongly) increasing or adding a sweet taste impression.

The terms “acidic taste”, “acidic taste impression”, “sour taste” and “sour taste impression” as used herein can preferably be used interchangeably.

The term “such that the at least one taste modifier provides no sweetness impression or a sweetness impression of less than 1.5% sucrose equivalents” is meant to be understood such that the respective taste modifier(s) itself/themselves does not have a sweet taste or a sweet taste of less than 1.5% sucrose equivalents. In case, several taste modifiers are present, preferably the combination of all taste modifiers does not have a sweet taste or a sweet taste of less than 1.5% sucrose equivalents.

In contrast, the term “such that the total amount of the at least one taste modifier is not sufficient to enhance the sweetness of a/another sweet tasting substance” refers to (an) other substance(s) present in the aroma composition. The sweetness of which is not enhanced by the total amount of all taste modifiers according to formula (I) together in the aroma composition according to the invention.

For a taste modifier providing (or not providing) a sweet taste, the sweetness must be measured. Measuring sweetness is typically based on the “percent sucrose equivalent”: Sweetness is commonly measured by comparison to reference solutions of sucrose, which is the standard to which all other sweeteners are compared. The human threshold for recognizing sweetness in a sucrose solution is at approximately 1.5% sucrose, which is thus defined as 1.5% sucrose equivalents. As a comparison, coffee is typically sweetened to an extent, which corresponds to a 5% sucrose solution (5% sucrose equivalents), whereas soft drinks are typically as sweet as a 10% sucrose solution (10% sucrose equivalents). For assessing the sweetness, taste panellists are requested to quantitate sweetness, using 2 to 15% sucrose solutions as references. Other sweeteners are then tasted at a series of dilutions to determine the concentration that is as sweet as a given percent sucrose reference.

It was surprisingly further found that the aroma composition according to the invention does not only reduce and/or mask the acidic taste impression but may also have a positive effect on other, desired taste impressions. Thus, it is preferred that the total amount of the at least one taste modifier according to formula (I) is sufficient to improve or enhance a desired taste impression, preferably one or more selected from spicy, mouthfeel, complex, balanced, juicy, floral, richness and combinations thereof, such as spicy, juicy and/or floral.

All of the taste impressions, as described above, are common taste impressions used by panellists to describe taste impressions and are thus known to the skilled person. To determine whether such a desired taste impression (or preferably any taste impression) is improved or enhanced, simple testing (usually in duplicates, preferably in triplicates) performed by panellists may be applied, in which the panellists evaluate e.g. samples with and samples without the at least one taste modifier(s) according to formula (I) and/or different samples with varying amounts of the at least one taste modifier according to formula (I).

It is preferred that the at least one taste modifier is/are selected from the group consisting of naringenin, phloretin, hesperetin, hesperetin dihydrochalcone, phyllodulcin, trilobatin, hydrangenol, hesperetin dihydrochalcone 4-O-glucoside, and salts thereof. Furthermore, it is preferred that the at least one taste modifier is/are

- phloretin,
- hesperetin,
- hesperetin dihydrochalcone,
- naringenin,
- phyllodulcin,
- phloretin and at least one further taste modifier selected from the group consisting of naringenin, hesperetin, hesperetin dihydrochalcone, phyllodulcin, trilobatin, hydrangenol, hesperetin dihydrochalcone 4-O-glucoside, or (a) salt(s) thereof.

The terms “and salts thereof” and “or (a) salt(s) thereof, as used herein, are to be used interchangeably and are both to be understood such that, in case several taste modifiers according to formula (I) are used, at least one is present as a salt of the above mentioned taste modifiers, whereas the other(s) may be present as the taste modifier as described above and/or a salt thereof. Thus, in case more than one taste modifier is used, the aroma composition according to the invention comprises a mixture of these taste modifiers, wherein

- all of the taste modifiers are present as described above, i.e. not as a salt thereof,
- all of the taste modifiers are present as a salt of the taste modifiers as described above, wherein a salt may be any physiologically acceptable salt thereof, or
- one or more of the taste modifiers are present as a salt of the taste modifiers as described above, wherein a salt may be any physiologically acceptable salt thereof, which includes the possibility, in which the aroma composition may comprise at least one taste modifier(s) as described above, i.e. not as a salt, as well as a salt of this/these taste modifier(s).

It was surprisingly found that phloretin was particularly advantageous in masking and/or reducing the acidic taste impression.

The taste modifiers listed above are described by the following chemical structures. In case of discrepancies, the chemical structures as shown below are the compounds, it is referred to herein.

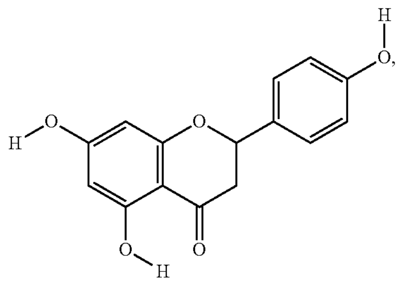

naringenin

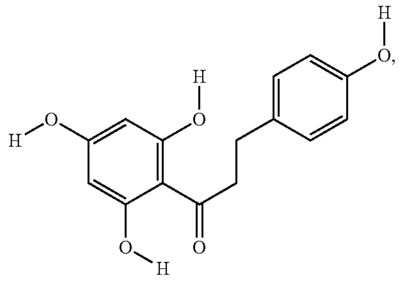

phloretin

-continued

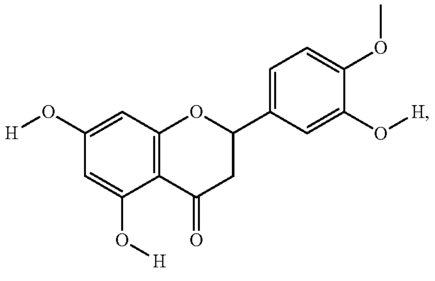

hesperetin

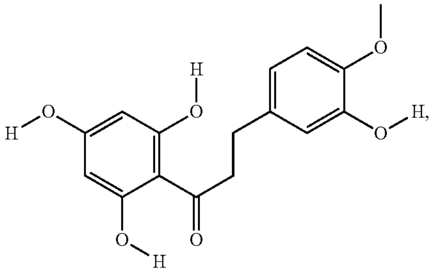

hesperetin dihydrochalcone

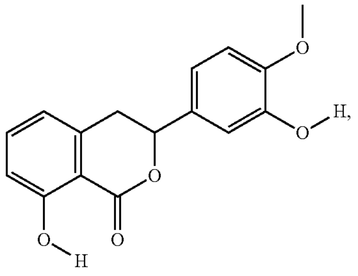

phyllodulcin

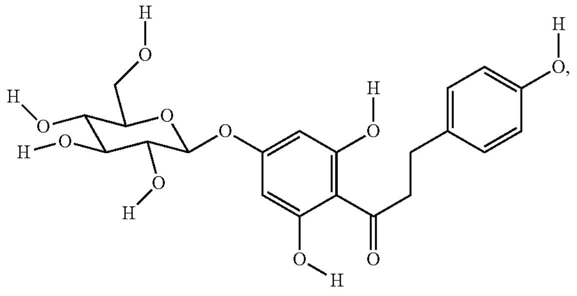

trilobatin

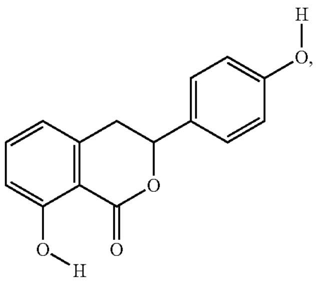

hydrangenol

-continued

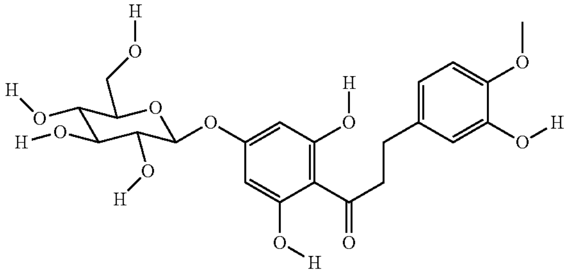

hesperetin dihydrochalcone 4-O-glucoside

Furthermore, it is preferred that the aroma composition according to the invention comprises two taste modifiers having the general formula I, wherein the taste modifiers are phloretin and hesperetin
phloretin and hesperetin dihydrochalcone
hesperetin and hesperetin dihydrochalcone
phloretin and naringenin
naringenin and hesperetin
phloretin and phyllodulcin
hesperetin and phyllodulcin
hesperetin dihydrochalcone and naringenin or hesperetin dihydrochalcone and phyllodulcin or salts thereof.

It is also preferred that the aroma composition according to the invention comprises three taste modifiers having the general formula I, wherein the taste modifiers are phloretin, hesperetin and naringenin
phloretin, hesperetin and hesperetin dihydrochalcone
phloretin, naringenin and hesperetin dihydrochalcone
phloretin, phyllodulcin and hesperetin dihydrochalcone
hesperetin, phyllodulcin and hesperetin dihydrochalcone
phloretin, hesperetin and phyllodulcin
phloretin, naringenin and phyllodulcin
hesperetin, naringenin and phyllodulcin
phloretin, hesperetin and trilobatin
phloretin, naringenin and trilobatin
hesperetin, naringenin and trilobatin or salts thereof.

It was surprisingly found that these compounds or these combinations of compounds, as described above, are particularly advantageous when used as taste modifiers in a composition according to the invention.

Furthermore it is preferred in the aroma composition according to the invention, that the at least one taste modifier is present in a total amount of 0.5 to 100 ppm, preferably in a total amount of 1 to 80 ppm and most preferably in a total amount of 1.5 to 60 ppm.

The term "the at least one taste modifier is present in a total amount of" is meant to be understood such that the total amount of all taste modifiers according to formula (I) is in the described range.

It was surprisingly found that in this range the masking and/or reduction of the acidic taste was particularly advantageous.

It is to be noted that the conditions of the total amount of taste modifiers according to formula (I), as described above, i.e. such that the at least one taste modifier provides no sweetness impression or a sweetness impression of less than 1.5% sucrose equivalents in the aroma composition, and such that the total amount of the at least one taste modifier is not sufficient to enhance the sweetness of a/another sweet tasting substance in the aroma composition, if present, still apply.

Typically, all conditions are complied with, when the total amount of taste modifiers according to formula (I) in the aroma composition according to the invention is in the ranges as described above. To confirm that all conditions are complied with, it is a simple procedure, as described above, and which is commonly and routinely performed in the state of the art, to determine whether these conditions are fulfilled. Thus, a skilled person can easily determine, whether the at least one taste modifiers according to formula (I) is present in a total as described as preferred above in the aroma composition, and provide(s) a sweetness impression itself/themselves or not (and if yes, in which extent) or enhance(s) the sweetness of a/another substance in the composition or not.

Consequently, it is preferred that the total amount of taste modifiers according to formula (I) in the composition is such that the at least one taste modifier provides no sweetness impression or a sweetness impression of less than 1.5% sucrose equivalents in the aroma composition, and such that the total amount of the at least one taste modifier is not sufficient to enhance the sweetness of a/another sweet tasting substance in the aroma composition, if present, and simultaneously is in a range of from 0.5 to 100 ppm, preferably in a range of from 1 to 80 ppm and most preferably in a range of from 1.5 to 60 ppm.

It was surprisingly found that the taste modifiers according to formula (I) are particularly advantageous for reducing and/or masking an acidic taste impression. In many applications, such as several foodstuffs or semi-luxury foods, a sour taste is generally desired, however not in an unpleasant extent. Thus, in this case, at least one compound conveying a sour taste needs to be present. Additionally, it is beneficial if such a compound is an acid, as it may then be used to adjust the pH value in the composition such that it is microbially stable. Furthermore, as the aroma composition according to the invention may be consumed, e.g. when present in foodstuff or semi-luxury foods, it is (in this case) necessary that the compound conveying a sour taste and providing the necessary pH value needed for microbial stability, as described above, is physiologically acceptable.

Thus, the aroma composition additionally preferably comprises at least one compound conveying a sour taste, preferably one or more food acids, preferably selected from the group consisting of acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid, in particular preferred one or more food acids selected from adipic acid, citric acid, fumaric acid, gluconic acid, glucuronic acid, lactic acid, malic acid, phosphoric acid, succinic acid, and tartaric acid.

Further, it is advantageous in many applications, that the aroma composition itself provides a sweet taste impression, e.g. when present in foodstuff or semi-luxury foods. Thus, in this case, at least one compound conveying a sweet taste at least needs to be present. Also in this case, it is necessary that the compound conveying a sweet taste is physiologically acceptable.

Therefore, additionally or alternatively to what was described for the at least one compound conveying a sour taste, it is preferred that the aroma composition according to the invention additionally comprises at least one compound conveying a sweet taste, preferably selected from the group consisting of natural sweeteners, preferably naturally occurring sweet tasting substances, including plant extracts, such as proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof, neohesperidindihydrochalkone, naringindihydrochalkone, steviolgylcoside, stevioside, steviolbioside, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, per-iandrin I-V, pterocaryoside, cyclocaryoside, mukurozioside, trans-Anethol, trans-cin-namaldehyd, bryoside, bryonoside, bryonodulcoside, carnosifloside, scandenoside, gypenoside, hematoxylin, cyanin, chlorogenic acid, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt, extracts or enriched fractions of such extracts such as extracts of thaumatococcus or *Stevia* ssp., particularly *Stevia rebaudiana*, swingle extracts, particularly momordica or *Siratio grosvenorii* or Luo-Han-Guo, extracts of *Glycerrhyzia* ssp., particularly *Glycerrhyzia glabra*, extracts of *rubus* ssp., particularly *rubus* suavissi-mus, extracts of *Lippia dulcis*, extracts of *Mycetia balansae*, preferably comprising balansin A and/or balansin B, or further extracts as described in EP 11168468;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, nar-ingindihydrochalcone, saccharin, saccharin sodium salt, aspartam, superaspartam, neotam, alitam, advantam, perillartin, sucralose, lugduname, carrelame, sucro-nonate or sucrooctate;

sweet tasting carbohydrates, preferably selected from the group consisting of sucrose, trehalose, lactose, maltose, melizitose, melibiose, raffinose, palatinose, lac-tulose, D-fructose, D-glucose, D-galactose, I-rhamnose, D-sorbose, D-mannose, D-tagatose, D-allulose, D-arabinose, I-arabinose, D-ribose, D-glyceraldehyde, malto-dextrin, and vegetable preparations comprising one or more of these carbohydrates, preferably in an amount of at least 5 wt.-%, preferably at least 15 wt.-%, wherein in these preparations the carbohydrates can be present as naturally occurring or synthetic carbohydrates or a mixture thereof, such as preferably honey, invert sugar syrup or highly enriched fructose syrup from maize starch, and/or the physiologically acceptable salts of these carbohydrates, particularly sodium, potassium, calcium or ammonium salts thereof;

sugar alcohols, preferably naturally occurring sugar alcohols, preferably selected from the group consisting of glycerin, erythritol, threitol, arabitol, ribitol, xylitol, sorbitol, mannitol, maltitol, isomaltit, dulcitol, lactitol and the physiologically acceptable salts thereof, particularly the sodium, potassium, calcium or ammonium salts thereof.

Furthermore, it is preferred that the aroma composition according to the invention comprises at least one compound conveying a sour taste, preferably as described above, and at least one compound conveying a sweet taste, preferably as described above, and wherein the total amount of the at least one taste modifier in the aroma composition is sufficient to improve the sweet/sour balance and/or reduce the sweet/sour imbalance and/or improve the mouthfeel in a composition. As described above, these characteristics can be easily determined by e.g. evaluations of panellists.

The term "improve the sweet/sour balance" is meant to be understood such that the balance of the sour and sweet taste impressions is in a range, in which a consumer generally perceives it as pleasant or at least not unpleasant, i.e. it is balanced. However, such a perception of the consumer includes a broad range of the sweet/sour balance. Improving the sweet/sour balance is thus achieved by enhancing the sweet taste impression, however within the limits as described above, and/or reducing and/or masking the sour taste impression.

The term "reduce the sweet/sour imbalance" is meant to be understood such that the balance of the sour and sweet taste impressions is in a range, in which a consumer generally perceives it as unpleasant or at least not pleasant, i.e. it is imbalanced. However, such a perception of the consumer includes a broad range of the sweet/sour balance. Reducing the sweet/sour imbalance is thus achieved by enhancing the sweet taste impression, however within the limits as described above, and/or reducing and/or masking the sour taste impression.

The invention is further related to a semi-finished product intended for nutrition, enjoyment or cosmetic or pharmaceutical purposes comprising the aroma composition according to the invention.

What was said above with regard to the aroma composition according to the invention applies accordingly to the aroma composition comprised in the semi-finished product and/or the semi-finished product itself.

It is preferred that the total amount of the at least one taste modifier in the semi-finished product is such that the at least one taste modifier provides no sweetness impression or a sweetness impression of less than 1.5% sucrose equivalents in the semi-finished product, and such that the total amount of the at least one taste modifier is not sufficient to enhance the sweetness of a/another sweet tasting substance in the semi-finished product, if present.

Thus, and for the reasons outlined above, it is preferred that the semi-finished product additionally comprises at least one compound conveying a sour taste, preferably one or more food acids, preferably selected from the group consisting of acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid, in particular preferred one or more food acids selected from adipic acid, citric acid, fumaric acid, gluconic acid, glucuronic acid, lactic acid, malic acid, phosphoric acid, succinic acid, and tartaric acid, and/or at least one compound conveying a sweet taste, preferably selected from the group consisting of natural sweeteners, preferably naturally occurring sweet tasting substances, including plant extracts, such as proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkone, naringindihydrochalkone, steviolgylcoside, stevioside, steviolbioside, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, per-iandrin I-V, pterocaryoside, cyclocaryoside, mukurozioside, trans-Anethol, trans-cin-namaldehyd, bryoside, bryonoside, bryonodulcoside, carnosifloside, scandenoside, gypenoside, hematoxylin, cyanin, chlorogenic acid, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of thaumatococcus or *Stevia* ssp., particularly *Stevia rebaudiana*, swingle extracts, particularly momordica or *Siratio grosvenorii* or Luo-Han-Guo, extracts of *Glycerrhyzia* ssp., particularly *Glycerrhyzia glabra*, extracts of *rubus* ssp., particularly *rubus* suavissi-mus, extracts of *Lippia dulcis*, extracts of *Mycetia balansae*, preferably comprising balansin A and/or balansin B, or further extracts as described in EP 11168468;

sweeteners, preferably synthetic sweet tasting substances, preferably selected from the group consisting of magap, sodium cyclamate or other physiologically acceptable salts of cyclamic acid, acesulfam K; neohesperidindihydrochalcone, nar-ingindihydrochalcone, saccharin, saccharin sodium salt, aspartam, superaspartam, neotam, alitam, advantam, perillartin, sucralose, lugduname, carrelame, sucro-nonate or sucrooctate;

sweet tasting carbohydrates, preferably selected from the group consisting of sucrose, trehalose, lactose, maltose, melizitose, melibiose, raffinose, palatinose, lac-tulose, D-fructose, D-glucose, D-galactose, I-rhamnose, D-sorbose, D-mannose, D-tagatose, D-allulose, D-arabinose, I-arabinose, D-ribose, D-glyceraldehyde, malto-dextrin, and vegetable preparations comprising one or more of these carbohydrates, preferably in an amount of at least 5 wt.-%, preferably at least 15 wt.-%, wherein in these preparations the carbohydrates can be present as naturally occurring or synthetic carbohydrates or a mixture thereof, such as preferably honey, invert sugar syrup or highly enriched fructose syrup from maize starch, and/or the physiologically acceptable salts of these carbohydrates, particularly sodium, potassium, calcium or ammonium salts thereof;

sugar alcohols, preferably naturally occurring sugar alcohols, preferably selected from the group consisting of glycerin, erythritol, threitol, arabitol, ribitol, xylitol, sorbitol, mannitol, maltitol, isomaltit, dulcitol, lactitol and the physiologically acceptable salts thereof, particularly the sodium, potassium, calcium or ammonium salts thereof, preferably wherein the semi-finished product comprises at least one compound conveying a sour taste and at least one compound conveying a sweet taste, wherein the total amount of the at least one taste modifier in the aroma composition, preferably in the semi-finished product, is sufficient to improve the sweet/sour balance and/or reduce the sweet/sour imbalance and/or improve the mouthfeel in the semi-finished product.

The at least one compound conveying a sour taste and/or the at least one compound conveying a sweet taste may be present in the aroma composition according to the invention before being added to produce the semi-finished product. Additionally or alternatively, the at least one compound conveying a sour taste and/or the at least one compound conveying a sweet taste may be present in a separate component than the aroma composition according to the invention (and/or a mixture of separate components) when producing the semi-finished product. is also preferred that, before being added to produce the semi-finished product, the aroma composition comprises the at least one compound conveying a sour taste or the at least one compound conveying a sweet taste, but not both, and a separate component (and/or a mixture of separate components) for producing the semi-finished product comprises the at least one compound conveying a sweet taste or the at least one compound conveying a sour taste. Thus, only the semi-finished product but not the aroma composition for producing the semi-finished product comprises both, the at least one compound conveying a sour taste and the at least one compound conveying a sweet taste. In this case, the desired effect caused by the aroma composition according to the invention is obtained during/after the production of the semi-finished product.

Preferably, a semi-finished product is to be understood as an orally consumable product, which, because of a very high content of flavourings and taste-imparting substances, is unsuitable for use as a ready-to-eat orally consumable product (in particular oral stuff or feed). Only by mixing with at least one further constituent (e.g. by reducing the concentration of the flavourings and taste-imparting substances in question) and optionally further process steps (e.g. heating, freezing) is the semi-finished product converted into a ready-to-eat orally consumable product (in particular oral stuff or feed).

The invention is further related to a finished product intended for nutrition, enjoyment or cosmetic or pharmaceutical purposes comprising the aroma composition according to the invention or a semi-finished product according to the invention.

What was said above with regard to the aroma composition according to the invention applies accordingly to the aroma composition comprised in the finished product.

It is further preferred that the total amount of the at least one taste modifier in the finished product is such that the at least one taste modifier provides no sweetness impression or a sweetness impression of less than 1.5% sucrose equivalents in the finished product, and such that the total amount of the at least one taste modifier is not sufficient to enhance the sweetness of a/another sweet tasting substance in the finished product, if present.

Thus, and for the reasons outlined above, it is preferred that the finished product additionally comprises at least one compound conveying a sour taste, preferably one or more food acids, preferably selected from the group consisting of acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid, in particular preferred one or more food acids selected from adipic acid, citric acid, fumaric acid, gluconic acid, glucuronic acid, lactic acid, malic acid, phosphoric acid, succinic acid, and tartaric acid, and/or at least one compound conveying a sweet taste, preferably selected from the group consisting of natural sweeteners, preferably naturally occurring sweet tasting substances, including plant extracts, such as proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof, neohesperidindihydrochalkone, naringindihydrochalkone, steviolgylcoside, stevioside, steviolbioside, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, per-iandrin I-V, pterocaryoside, cyclocaryoside, mukurozioside, trans-Anethol, trans-cin-namaldehyd, bryoside, bryonoside, bryonodulcoside, carnosifloside, scandenoside, gypenoside, hematoxylin, cyanin, chlorogenic acid, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt, extracts or enriched fractions of such extracts such as extracts of thaumatococcus or *Stevia* ssp., particularly *Stevia rebaudiana*, swingle extracts, particularly momordica or *Siratio grosvenorii* or Luo-Han-Guo, extracts of *Glycerrhyzia* ssp., *Glycerrhyzia*

*glabra*, extracts of *rubus* ssp., particularly *rubus* suavissi-mus, extracts of *Lippia dulcis*, extracts of *Mycetia balansae*, preferably comprising balansin A and/or balansin B, or further extracts as described in EP 11168468; synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, nar-ingindihydrochalcone, saccharin, saccharin sodium salt, aspartam, superaspartam, neotam, alitam, advantam, perillartin, sucralose, lugduname, carrelame, sucro-nonate or sucrooctate;

sweet tasting carbohydrates, preferably selected from the group consisting of sucrose, trehalose, lactose, maltose, melizitose, melibiose, raffinose, palatinose, lac-tulose, D-fructose, D-glucose, D-galactose, I-rhamnose, D-sorbose, D-mannose, D-tagatose, D-allulose, D-arabinose, I-arabinose, D-ribose, D-glyceraldehyde, malto-dextrin, and vegetable preparations comprising one or more of these carbohydrates, preferably in an amount of at least 5 wt.-%, preferably at least 15 wt.-%, wherein in these preparations the carbohydrates can be present as naturally occurring or synthetic carbohydrates or a mixture thereof, such as preferably honey, invert sugar syrup or highly enriched fructose syrup from maize starch, and/or the physiologically acceptable salts of these carbohydrates, particularly sodium, potassium, calcium or ammonium salts thereof;

sugar alcohols, preferably naturally occurring sugar alcohols, preferably selected from the group consisting of glycerin, erythritol, threitol, arabitol, ribitol, xylitol, sorbitol, mannitol, maltitol, isomaltit, dulcitol, lactitol and the physiologically acceptable salts thereof, particularly the sodium, potassium, calcium or ammonium salts thereof, preferably wherein the finished product comprises at least one compound conveying a sour taste and at least one compound conveying a sweet taste, wherein the total amount of the at least one taste modifier in the aroma composition, preferably in the semi-finished product, particularly preferably in the finished product, is sufficient to improve the sweet/sour balance and/or reduce the sweet/sour imbalance and/or improve the mouthfeel in the finished product.

The at least one compound conveying a sour taste and/or the at least one compound conveying a sweet taste may be present in the aroma composition according to the invention before being added to produce the finished product. Additionally or alternatively, the at least one compound conveying a sour taste and/or the at least one compound conveying a sweet taste may be present in a separate component than the aroma composition according to the invention (and/or a mixture of separate components) when producing the finished product.

It is also preferred that, before being added to produce the finished product, the aroma composition comprises the at least one compound conveying a sour taste or the at least one compound conveying a sweet taste, but not both, and a separate component (and/or a mixture of separate components) for producing the finished product comprises the at least one compound conveying a sweet taste or the at least one compound conveying a sour taste. Thus, only the finished product but not the aroma composition for producing the finished product comprises both, the at least one compound conveying a sour taste and the at least one compound conveying a sweet taste. In this case, the desired effect caused by the aroma composition according to the invention is obtained during/after the production of the finished product.

What was said with regard to the semi-finished product above, applies accordingly, in case, a semi-finished product is used to produce the finished product.

Preferably, a finished product may be selected from the group consisting of (reduced-cal-orie) baked goods (e.g. bread, dry biscuits, cakes, other baked articles), confectionery (e.g. muesli bar products, chocolates, chocolate bars, other products in bar form, fruit gums, dragees, hard and soft caramels, chewing gum), non-alcoholic drinks (e.g. cocoa, coffee, green tea, black tea, (green, black) tea drinks enriched with (green, black) tea extracts, rooibos tea, other herbal teas, fruit-containing soft drinks, isotonic drinks, refreshing drinks, nectars, fruit and vegetable juices, fruit or vegetable juice preparations), instant drinks (e.g. instant cocoa drinks, instant tea drinks, instant coffee drinks), meat products (e.g. ham, fresh sausage or raw sausage preparations, spiced or marinated fresh or salt meat products), eggs or egg products (dried egg, egg white, egg yolk), cereal products (e.g. breakfast cereals, muesli bars, precooked ready-to-eat rice products), dairy products (e.g. full-fat or reduced-fat or fat-free milk drinks, rice pudding, yoghurt, kefir, cream cheese, soft cheese, hard cheese, dried milk powder, whey, butter, buttermilk, ice-cream, partially or completely hydrolysed milk-protein-containing products), products made from soy protein or other soy-bean fractions (e.g. soy milk and products produced therefrom, drinks containing isolated or enzymatically treated soy protein, drinks containing soy flour, preparations containing soy lecithin, fermented products such as tofu or tempeh or products produced therefrom and mixtures with fruit preparations and optionally flavours), dairy-like preparations (milk-type, yoghurt-type, dessert-type, ice cream) from protein rich plant materials (e.g. from seed materials of oat, almond, pea, lupine, lentils, *faba* beans, chickpea, rice, canola), plant protein-enriched non-dairy drinks, fruit preparations (e.g. jams, sorbets, fruit sauces, fruit fillings), vegetable preparations (e.g. ketchup, sauces, dried vegetables, frozen vegetables, precooked vegetables, boiled-down vegetables), snacks (e.g. baked or fried potato crisps or potato dough products, maize- or groundnut-based extrudates), fat- and oil-based products or emulsions thereof (e.g. mayonnaise, remoulade, dressings, in each case full-fat or reduced-fat), other ready-made dishes and soups (e.g. dried soups, instant soups, precooked soups), spices, spice mixtures and in particular seasonings which are used, for example, in the snacks field, sweetener preparations, tablets or sachets, other preparations for sweetening or whitening drinks.

Furthermore, the invention also relates to the use of at least one taste modifier selected from the group consisting of naringenin, phloretin, hesperetin, hesperetin dihydrochalcone, phyllodulcin, trilobatin, hydrangenol, hesperetin dihydrochalcone 4-O-glucoside, and salts thereof for improving the sweet/sour balance and/or reducing the sweet/sour imbalance and/or improving the mouthfeel in a preparation, preferably, wherein the preparation comprises at least one compound conveying a sour taste and at least one compound conveying a sweet taste.

What was said with regard to the aroma composition according to the invention, a semi-finished product according to the invention and the finished product according to the invention applies accordingly, particularly in case the preparation is a semi-finished or a finished product.

Preferably in the use according to the invention, the preparation is selected from the group consisting of preparations intended for nutrition, enjoyment or cosmetic or pharmaceutical purposes, preferably aroma compositions, semi-finished products and finished products as respectively defined above.

Further, the present invention is related to a method for improving the sweet/sour balance and/or reducing the sweet/sour imbalance and/or improving the mouthfeel in a preparation, comprising or consisting of the steps:

i) providing a preparation, the sweet/sour balance and/or the mouthfeel of which should be improved and/or the sweet/sour imbalance of which should be reduced, preferably wherein the preparation is selected from the group consisting of preparations intended for nutrition, enjoyment or cosmetic or pharmaceutical purposes, ii) providing an aroma composition according to the invention, iii) mixing the preparation provided in step i) with the aroma composition provided in step ii), iv) optionally, further processing of the mixture obtained in step iii), v) obtaining a composition with an improved sweet/sour balance and/or a reduced sweet/sour imbalance and/or an improved mouthfeel.

What was said with regard to the aroma composition according to the invention, a semi-finished product according to the invention and the finished product according to the invention applies accordingly, particularly in case the preparation is a semi-finished or a finished product. Furthermore, what was said with regard to the preparation above, applies accordingly.

Thus, and for the reasons outlined above, it is preferred in the method according to the invention that the preparation comprises at least one compound conveying a sour taste, preferably one or more food acids, preferably selected from the group consisting of acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid, in particular preferred one or more food acids selected from adipic acid, citric acid, fumaric acid, gluconic acid, glucuronic acid, lactic acid, malic acid, phosphoric acid, succinic acid, and tartaric acid.

Also for the reasons outlined above, it is preferred in the method according to the invention that the preparation comprises at least one compound conveying a sweet taste, preferably selected from the group consisting of natural sweeteners, preferably naturally occurring sweet tasting substances, including plant extracts, such as proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof; neohesperidindihydrochalkone, naringindihydrochalkone, steviolgylcoside, stevioside, steviolbioside, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, per-iandrin I-V, pterocaryoside, cyclocaryoside, mukurozioside, trans-Anethol, trans-cin-namaldehyd, bryoside, bryonoside, bryonodulcoside, carnosifloside, scandenoside, gypenoside, hematoxylin, cyanin, chlorogenic acid, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt; extracts or enriched fractions of such extracts such as extracts of thaumatococcus or *Stevia* ssp., particularly *Stevia rebaudiana*, swingle extracts, particularly momordica or *Siratio grosvenorii* or Luo-Han-Guo, extracts of *Glycerrhyzia* ssp., particularly *Glycerrhyzia glabra*, extracts of *rubus* ssp., particularly *rubus* suavissi-mus, extracts of *Lippia dulcis*, extracts of *Mycetia balansae*, preferably comprising balansin A and/or balansin B, or further extracts as described in EP 11168468;

synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, nar-ingindihydrochalcone, saccharin, saccharin sodium salt, aspartam, superaspartam, neotam, alitam, advantam, perillartin, sucralose, lugduname, carrelame, sucro-nonate or sucrooctate;

sweet tasting carbohydrates, preferably selected from the group consisting of sucrose, trehalose, lactose, maltose, melizitose, melibiose, raffinose, palatinose, lac-tulose, D-fructose, D-glucose, D-galactose, I-rhamnose, D-sorbose, D-mannose, D-tagatose, D-allulose, D-arabinose, I-arabinose, D-ribose, D-glyceraldehyde, malto-dextrin, and vegetable preparations comprising one or more of these carbohydrates, preferably in an amount of at least 5 wt.-%, preferably at least 15 wt.-%, wherein in these preparations the carbohydrates can be present as naturally occurring or synthetic carbohydrates or a mixture thereof, such as preferably honey, invert sugar syrup or highly enriched fructose syrup from maize starch, and/or the physiologically acceptable salts of these carbohydrates, particularly sodium, potassium, calcium or ammonium salts thereof;

sugar alcohols, preferably naturally occurring sugar alcohols, preferably selected from the group consisting of glycerin, erythritol, threitol, arabitol, ribitol, xylitol, sorbitol, mannitol, maltitol, isomaltit, dulcitol, lactitol and the physiologically acceptable salts thereof, particularly the sodium, potassium, calcium or ammonium salts thereof.

Further features and advantages of the invention result from the subsequent description of preferred application examples.

EXAMPLES

Example 1: Reduction of Acidity and Limited Effect on Sweetness

The acidic taste impression as well as the sweet taste impression were evaluated in an ice tea preparation. Provided was the ice tea preparation (sugar-reduced) (A1) as well as such ice tea preparations (sugar-reduced) including aroma compositions according to the invention. Further, as a comparison, the ice tea preparation with the regular sugar content (A2) was provided. The sugar-reduced preparation (A1) had 5° Bx, the preparation with the regular sugar content (A2) had 6.5° Bx. Thus, the increased sugar content in A2 corresponds to 1.5% sucrose equivalents, i.e. the threshold for human perception as described above.

Samples of 300 ml of each preparation were evaluated by panellists with regard to the acidic and the sweet taste impressions. Furthermore, the impressions mouthfeel and aftertaste, as generally important impressions of a consumer, were evaluated.

The number of panellists was N=7.

The results are listed in the following table and are plotted in FIG. 1.

| | Sample | Sweetness impact | Sweetness intensity | Mouthfeel | Acidity | Aftertaste |
|---|---|---|---|---|---|---|
| 1 | Reduced Base (A1) Ice Tea Peach | 3 | 4 | 3.5 | 4 | 2.5 |
| 2 | A1 + 20 ppm hesperetin | 4 | 4.5 | 4 | 3.75 | 3 |
| 3 | A1 + 30 ppm phloretin | 4 | 4.5 | 4.5 | 3.5 | 3 |
| 4 | A1 + 30 ppm phloretin + 7 ppm hesperetin | 5 | 5 | 5 | 3 | 2.5 |
| 5 | A1 + 30 ppm phloretin + 20 ppm hesperetin dihydrochalcone | 4.5 | 4.5 | 4.5 | 3.5 | 3 |
| 6 | A1 + 20 ppm phloretin + 3 ppm phyllodulcin + 40 ppm naringenin | 4.5 | 4.5 | 4.5 | 3.5 | 3.25 |
| 7 | A1 + 5 ppm hesperetin + 40 ppm naringenin + 40 ppm trilobatin | 4.5 | 4.5 | 4.75 | 3 | 3 |
| 8 | Full Sugar (A2) Ice Tea Peach | 6 | 6 | 5.5 | 2.75 | 2 |

The results show that the acidic taste impression was reduced by adding an aroma composition according to the invention. Also, A2 reduced the acidic taste impression. However, in A2 the impact and intensity of sweetness is perceived as very high compared to A1.

Thus, the reduction and/or masking effect on the acidic taste impression is achieved by ahigh sweetness impression in A2.

The impact and intensity of sweetness in the aroma compositions according to the invention is clearly below the evaluations of A2. Consequently, the aroma compositions according to the invention provide a sweetness impression of less than 1.5% sucrose equivalents (as in A2).

Furthermore, the aroma compositions according to the invention provide a better aftertaste and mouthfeel as the sugar-reduced preparation (A1).

Example 2: Reduction of Acidity and Positive Effect on Further Taste Impressions The acidic taste impression as well as further taste impressions were evaluated in beverage preparations. Provided were the respective beverage preparation (ice tea peach (A3); lemon/lime flavoured beverage (A4)) as well as such preparations including aroma compositions according to the invention with one taste modifier according to formula (I).

Samples of 300 ml of each preparation were evaluated by panellists with regard to the acidic and further taste impressions, which are important to consumers.

The number of panellists was N=8.

Figure 2:
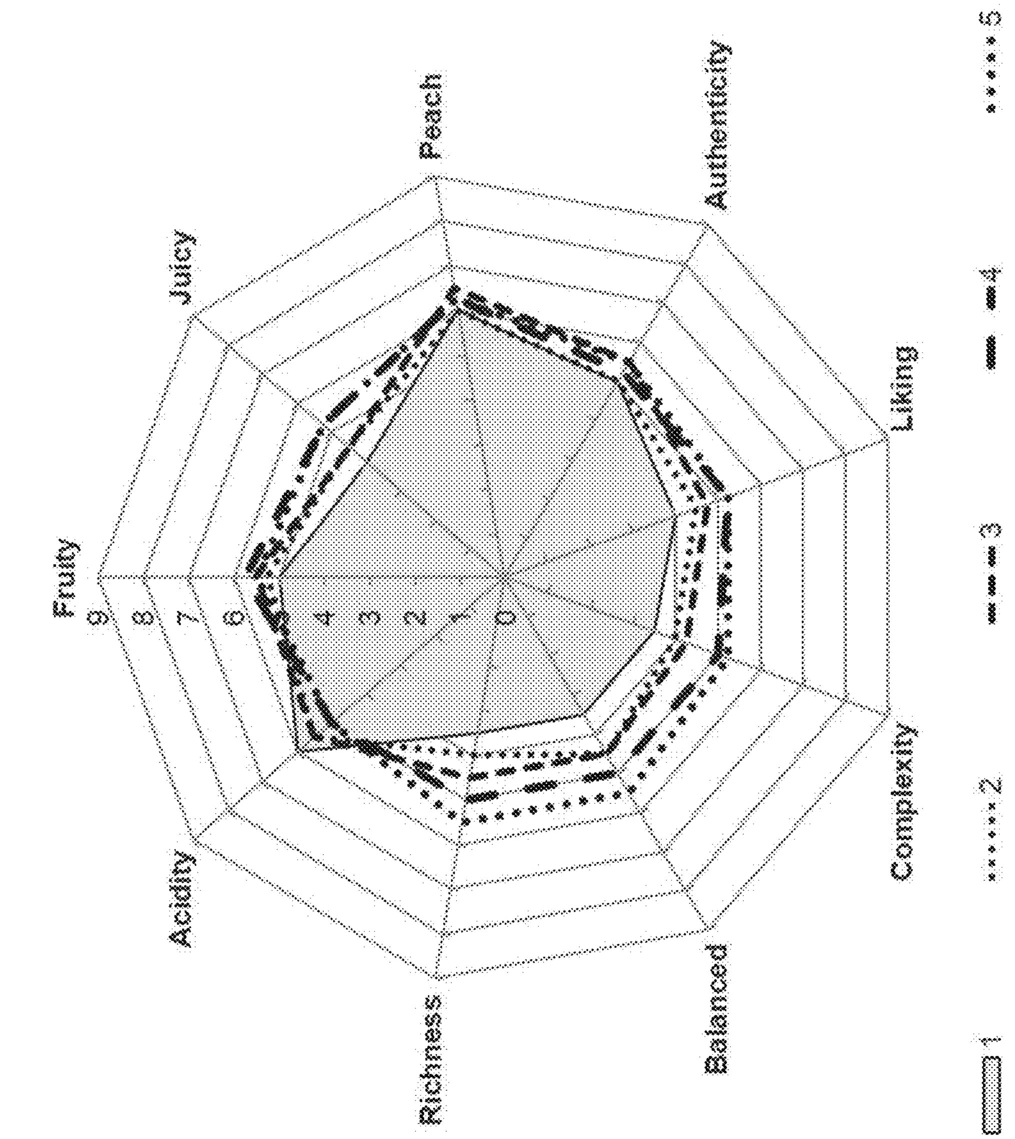
FIG. 2 shows the sensory evaluation of Example 2 for an ice tea peach preparation, illustrating reduced acidity and improved or comparable taste attributes relative to the control.
Figure 3:
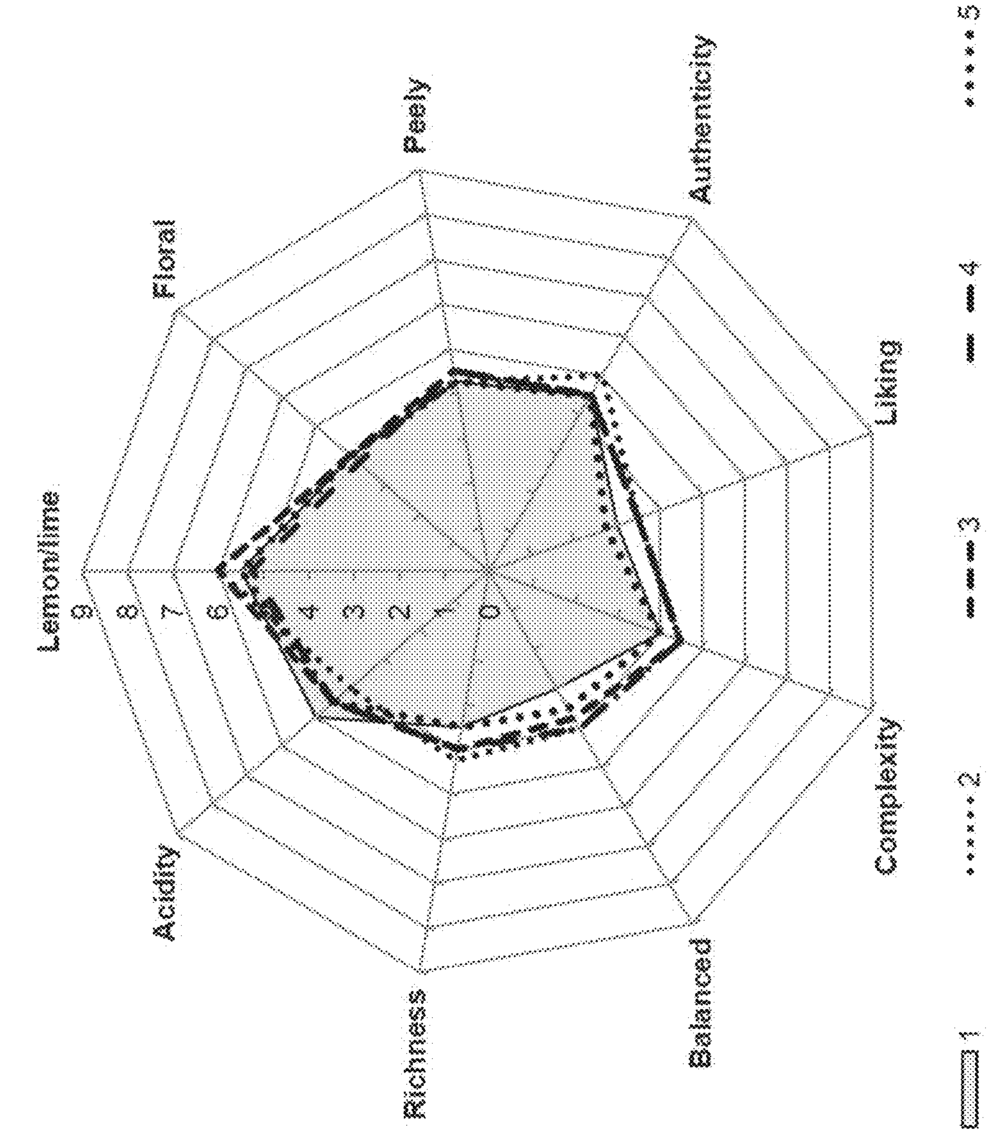
FIG. 3 shows the sensory evaluation of Example 2 for a lemon/lime beverage base, demonstrating reduced acidity and improved or comparable taste attributes relative to the control.

The results are listed in the following tables and are plotted in FIGS. 2 and 3.

| | Sample | Fruity | Juicy | Peach | Authenticity | Liking | Complexity | Balanced | Richness | Acidity |
|---|---|---|---|---|---|---|---|---|---|---|
| 1 | Ice Tea Peach (A3) | 5 | 4 | 6 | 5 | 4 | 3.5 | 3.5 | 3.5 | 6 |
| 2 | A3 + 40 ppm trilobatin | 5.25 | 4.5 | 6 | 5 | 4.5 | 4 | 4.5 | 4 | 5.5 |
| 3 | A3 + 7 ppm hesperetin | 5.5 | 4.5 | 6.5 | 5.5 | 4.75 | 4.25 | 4.5 | 4.5 | 5.5 |
| 4 | A3 + 30 ppm phloretin | 5.75 | 5.25 | 6.25 | 5.25 | 5.25 | 5 | 5 | 5 | 5 |
| 5 | A3 + 40 ppm naringenin | 5.5 | 5.25 | 6.25 | 5.5 | 5.25 | 5.25 | 5.5 | 5.5 | 5 |

| | Sample | Lemon/lime | Floral | Peely | Authenticity | Liking | Complexity | Balanced | Richness | Acidity |
|---|---|---|---|---|---|---|---|---|---|---|
| 1 | Lemon/lime base (A4) | 5.5 | 4 | 4.25 | 4.5 | 3 | 4 | 3 | 3.5 | 5 |
| 2 | A4 + 30 ppm phloretin | 6 | 4 | 4.25 | 5 | 3.5 | 4.5 | 4 | 4.25 | 4 |

-continued

| | Sample | Lemon/lime | Floral | Peely | Authenticity | Liking | Complexity | Balanced | Richness | Acidity |
|---|---|---|---|---|---|---|---|---|---|---|
| 3 | A4 + 40 ppm naringenin | 6 | 4 | 4.5 | 4.5 | 3.5 | 4.5 | 3.75 | 4 | 4.5 |
| 4 | A4 + 7 ppm hesperetin | 5.25 | 3.75 | 4.5 | 4.5 | 3.5 | 4.5 | 4 | 4 | 4.5 |
| 5 | A4 + 40 ppm trilobatin | 5.5 | 4 | 4.25 | 4.5 | 2.75 | 4 | 3.5 | 3.5 | 4.5 |

The results show that all aroma compositions according to the invention provided a lower acidity and simultaneously an improved or at least similar evaluation in the further taste impressions.

Example 3: Reduction of Acidity and Positive Effect on Further Taste Impressions The acidic taste impression as well as further taste impressions were evaluated in beverage preparations. Provided were the respective beverage preparation (ice tea peach (A5); lemon/lime flavoured beverage (A6); orange flavoured beverage (A7)) as well as such preparations including aroma compositions according to the invention with a combination of taste modifiers according to formula (I).

Samples of 300 ml of each preparation were evaluated by panellists with regard to the acidic and further taste impressions, which are important to consumers.

The number of panellists was N=7 (with regard to A5 and A7) and N=5 (with regard to A6).

Figure 4:
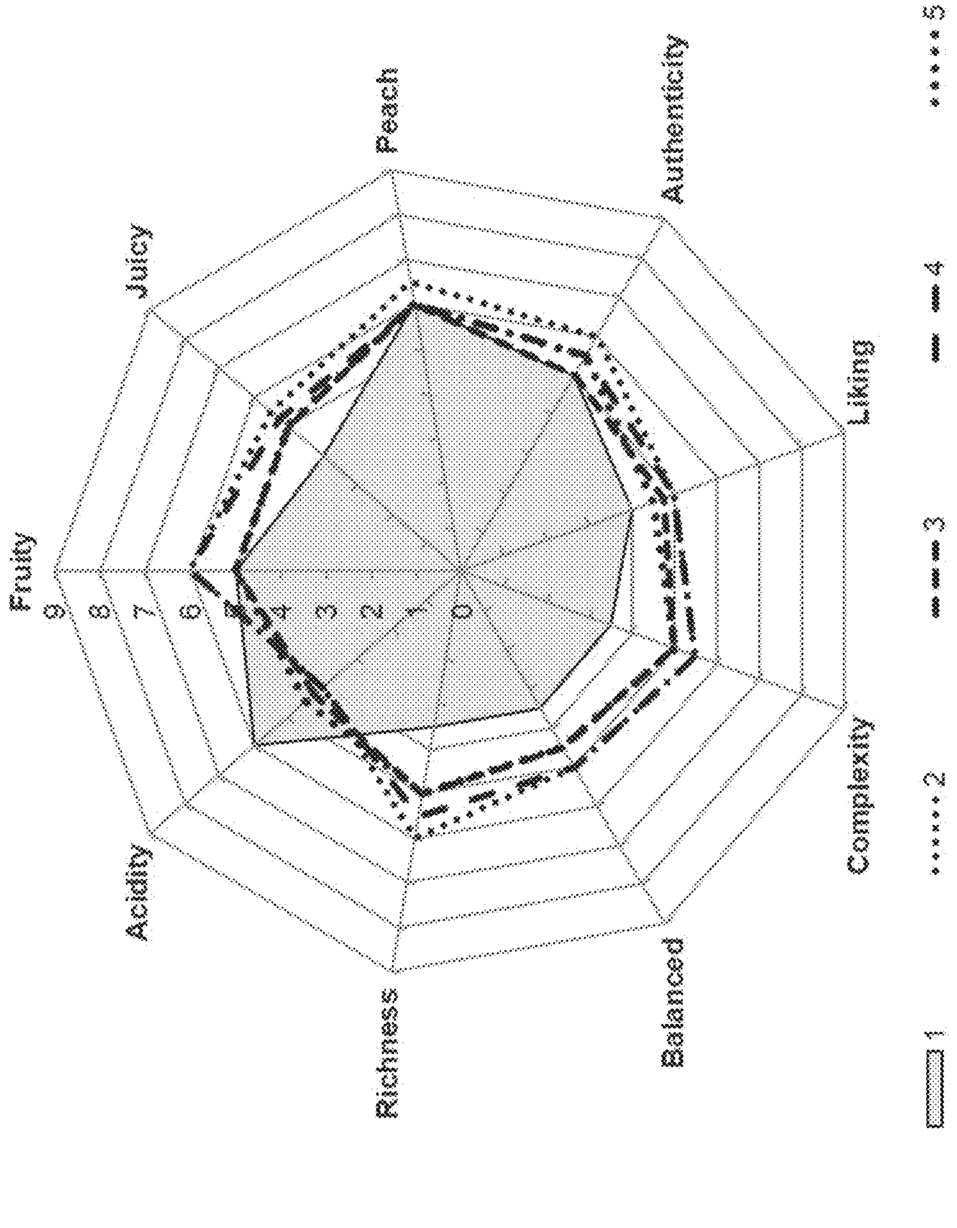
FIG. 4 shows the sensory evaluation of Example 3 for an ice tea peach preparation, demonstrating reduced acidity and improved or similar taste attributes for compositions containing combinations of taste modifiers.
Figure 5:
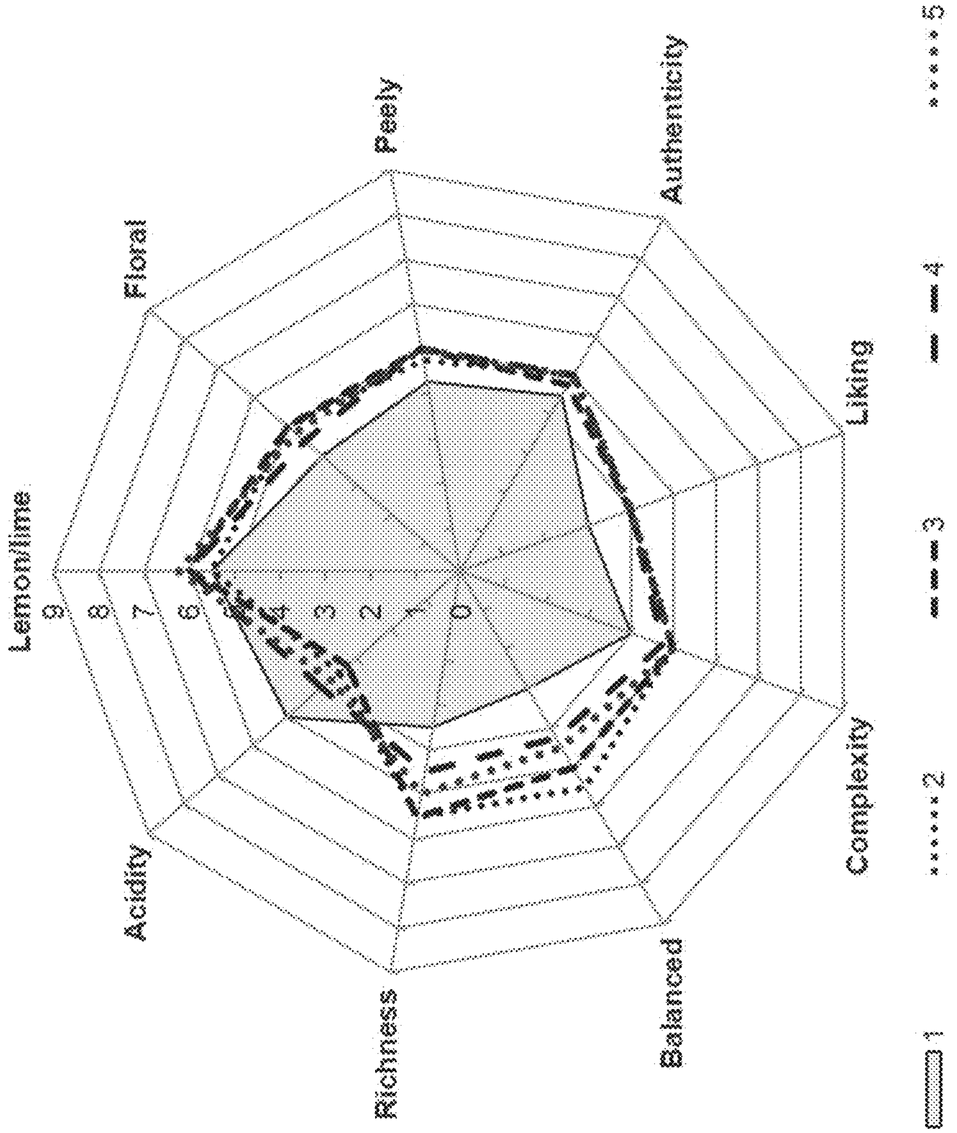
FIG. 5 shows the sensory evaluation of Example 3 for a lemon/lime beverage base, illustrating reduced acidity and improved or comparable taste attributes relative to the control.
Figure 6:
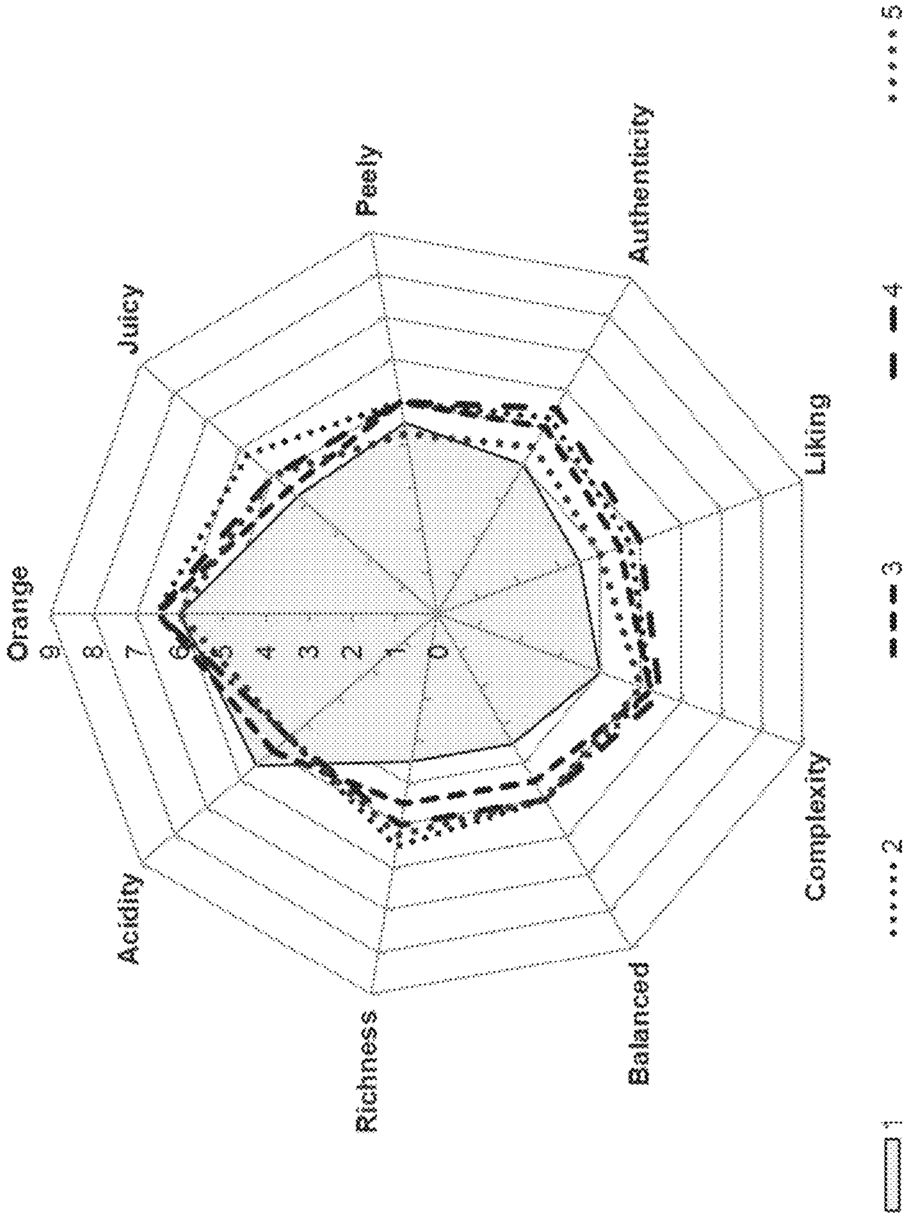
FIG. 6 shows the sensory evaluation of Example 3 for an orange-flavored beverage base, demonstrating reduced acidity and improved or comparable taste attributes relative to the control.
Figure 7:
FIG. 7 shows the sensory evaluation of Example 4 for a lemon/lime base containing 0.1% citric acid, demonstrating reduced acidity and improved or comparable taste attributes when using the aroma composition according to the invention.
Figure 8:
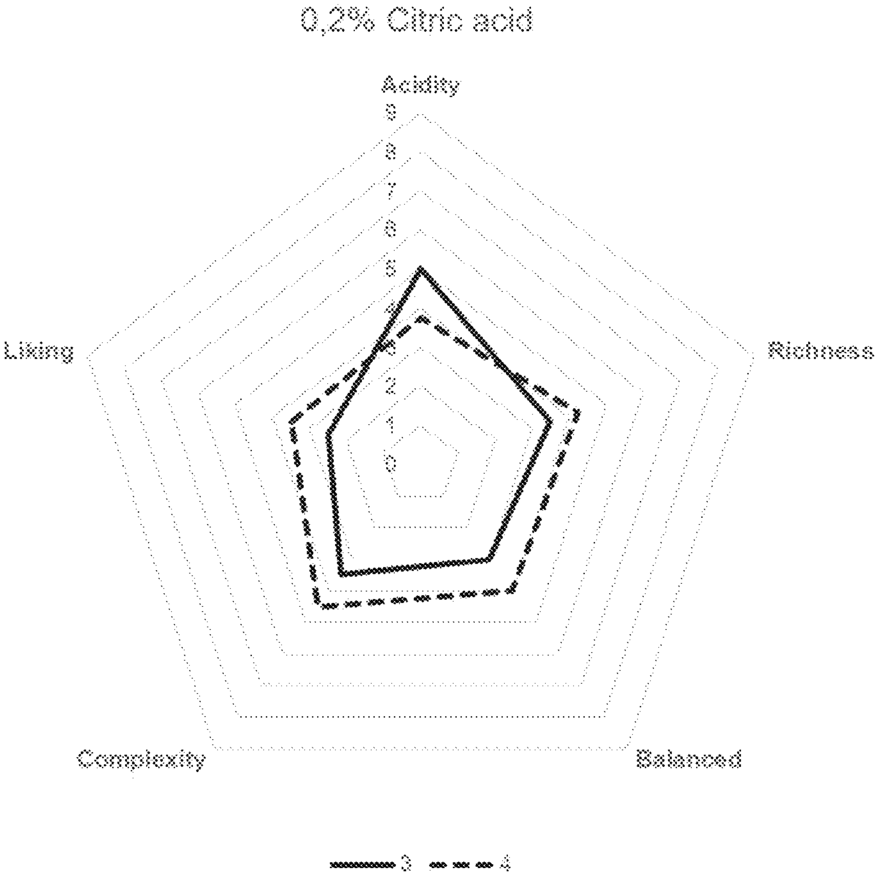
FIG. 8 shows the sensory evaluation of Example 4 for a lemon/lime base containing 0.2% citric acid, demonstrating reduced acidity and improved or comparable taste attributes when using the aroma composition according to the invention.
Figure 9:
FIG. 9 shows the sensory evaluation of Example 4 for a lemon/lime base containing 0.3% citric acid, demonstrating reduced acidity and improved or comparable taste attributes when using the aroma composition according to the invention.
Figure 10:
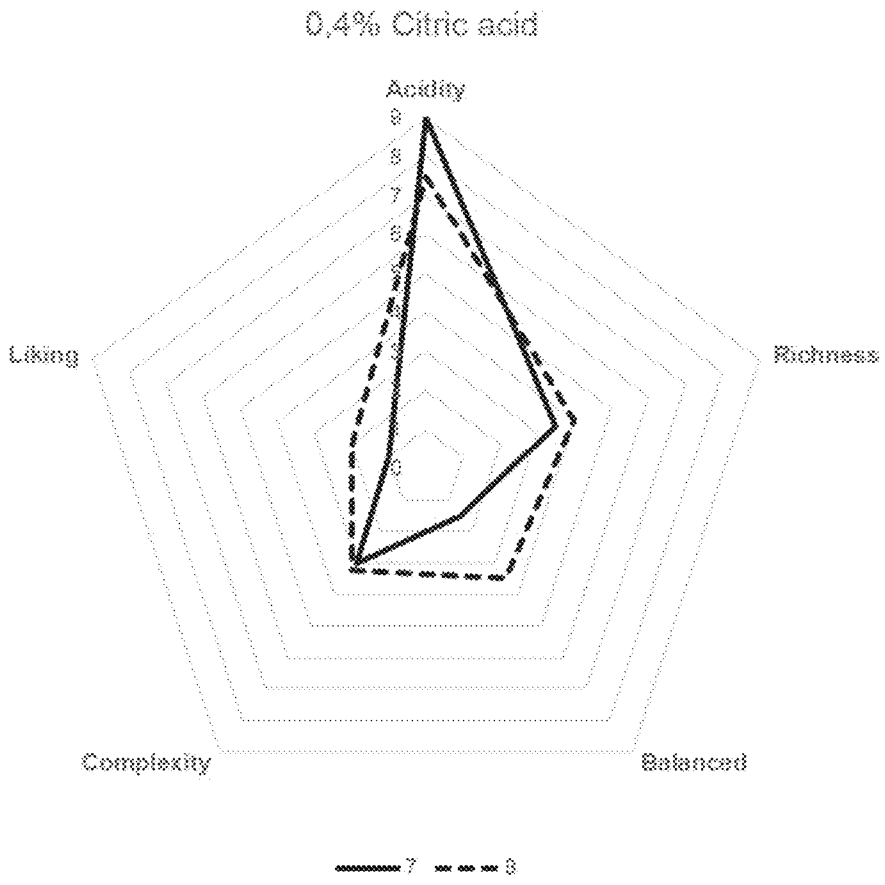
FIG. 10 shows the sensory evaluation of Example 4 for a lemon/lime base containing 0.4% citric acid, demonstrating reduced acidity and improved or comparable taste attributes when using the aroma composition according to the invention.

The results are listed in the following tables and are plotted in FIGS. 4, 5 and 6.

| | Sample | Fruity | Juicy | Peach | Authenticity | Liking | Complexity | Balanced | Richness | Acidity |
|---|---|---|---|---|---|---|---|---|---|---|
| 1 | Ice Tea Peach (A5) | 5 | 4 | 6 | 5 | 4 | 3.5 | 3.5 | 3.5 | 6 |
| 2 | A5 + 30 ppm phloretin + 7 ppm hesperetin | 6 | 5.5 | 6.5 | 6 | 5 | 5.5 | 5 | 6 | 4 |
| 3 | A5 + 30 ppm phloretin + 20 ppm hesperetin dihydrochalcone | 5 | 5 | 6 | 5 | 4.75 | 5 | 4.5 | 5 | 4.25 |
| 4 | A5 + 20 ppm phloretin + 3 ppm phyllodulcin + 40 ppm naringenin | 6 | 5.25 | 6 | 5.5 | 5 | 5.5 | 5 | 5.5 | 4 |
| 5 | A5 + 5 ppm hesperetin + 40 ppm naringenin + 40 ppm trilobatin | 5 | 5 | 6 | 5.5 | 4.5 | 5 | 4.5 | 5 | 4.5 |

| | Sample | Lemon/lime | Floral | Peely | Authenticity | Liking | Complexity | Balanced | Richness | Acidity |
|---|---|---|---|---|---|---|---|---|---|---|
| 1 | Lemon/lime base (A6) | 5.5 | 4 | 4.25 | 4.5 | 3 | 4 | 3 | 3.5 | 5 |
| 2 | A6 + 30 ppm phloretin + 7 ppm hesperetin | 5.5 | 5 | 4.75 | 5 | 4 | 5 | 5.5 | 5.5 | 3.5 |
| 3 | A6 + 30 ppm phloretin + 20 ppm hesperetin dihydrochalcone | 6 | 5 | 5 | 4.75 | 4 | 5 | 5 | 5.5 | 3.25 |
| 4 | A6 + 20 ppm phloretin + 3 ppm phyllodulcin + 40 ppm naringenin | 6 | 4.5 | 5 | 5 | 4 | 4.75 | 4.25 | 4.5 | 4 |
| 5 | A6 + 5 ppm hesperetin + 40 ppm naringenin + 40 ppm trilobatin | 6.25 | 4.75 | 5 | 5 | 4 | 5 | 4.5 | 5 | 3.75 |

| | Sample | Orange | Juicy | Peely | Authenticity | Liking | Complexity | Balanced | Richness | Acidity |
|---|---|---|---|---|---|---|---|---|---|---|
| 1 | Orange flavoured base (A7) | 6 | 4.25 | 4.5 | 4 | 3.5 | 4 | 3.5 | 3.5 | 5.5 |
| 2 | A7 + 30 ppm phloretin + 7 ppm hesperetin | 6.5 | 5.75 | 5 | 5.25 | 4.75 | 5.25 | 5 | 5.5 | 4.5 |
| 3 | A7 + 30 ppm phloretin + 20 ppm hesperetin dihydrochalcone | 6.5 | 4.5 | 5 | 5 | 4.5 | 5.25 | 4.5 | 4.5 | 5 |
| 4 | A7 + 20 ppm phloretin + 3 ppm phyllodulcin + 40 ppm naringenin | 6.5 | 5 | 5 | 5.5 | 5 | 5.5 | 5 | 5 | 4.5 |
| 5 | A7 + 5 ppm hesperetin + 40 ppm naringenin + 40 ppm trilobatin | 6 | 5 | 4.25 | 4.5 | 4 | 5 | 5 | 5.25 | 4.5 |

The results show that all aroma compositions according to the invention provided a signif-icantly lower acidity and simultaneously an improved or at least similar evaluation in the further taste impressions.

Example 4: Reduction of Acidity Independent of the Amount of Acid

The acidic taste impression and further taste impressions were evaluated in beverage preparations. Provided were the respective beverage preparation (lemon-lime base (A8)) with increasing amounts of citric acid as well as such preparations including an aroma composition according to the invention.

Samples of 300 ml of each preparation were evaluated by panellists with regard to the acidic and the further taste impressions, which are important to consumers.

The number of panellists was N=6.

The results are listed in the following tables and are plotted in FIGS. 7 to 10.

| Sample | Acidity | Richness | Balanced | Complexity | Liking |
|---|---|---|---|---|---|
| 1 Lemon-lime base (A8.1) + 0.1% Citric acid | 3 | 2.5 | 3 | 3.5 | 2 |
| 2 A8.1 + 30 ppm phloretin + 7 ppm hesperetin | 2 | 4 | 4 | 4.5 | 3.5 |
| 3 Lemon-lime base (A8.2) + 0.2% Citric acid | 5 | 3.5 | 3 | 3.5 | 2.5 |
| 4 A8.2 + 30 ppm phloretin + 7 ppm hesperetin | 3.75 | 4.25 | 4 | 4.5 | 3.5 |
| 5 Lemon-lime base (A8.3) + 0.3% Citric acid | 7.5 | 3.25 | 2 | 2.5 | 1.75 |
| 6 A8.3 + 30 ppm phloretin + 7 ppm hesperetin | 6.25 | 4.5 | 3.5 | 4 | 3 |
| 7 Lemon-lime base (A8.4) + 0.4% Citric acid | 9 | 3.5 | 1.5 | 3 | 1 |
| 8 A8.4 + 30 ppm phloretin + 7 ppm hesperetin | 7.5 | 4 | 3.5 | 3.25 | 2 |

The results show that the aroma composition according to the invention provided a significantly lower acidity independent of the amount of acid and simultaneously an improved or at least similar evaluation in the further taste impressions.

The invention claimed is:

1. An aroma composition comprising one or more taste modifiers of Formula (I), or salts thereof:

(I)

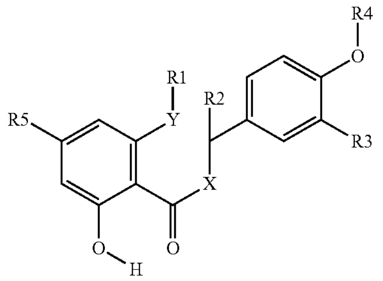

wherein

X is $—CH_2—$and Y is O, or X is O and Y is $—CH_2—$, provided that if X is $—CH_2—$ and Y is 0, R1 and R2 together represent a single bond, or R1 is H and R2 is H, and if X is —O— and Y is $—CH_2—$, R1 and R2 together represent a single bond, R3 is —H or —OH, and R4 is —H or $—CH_3$; and provided that the one or more taste modifiers are present in an amount that (i) provides no sweetness impression or a sweetness impression of less than 1.5% sucrose equivalents in the aroma composition, and (ii) is not sufficient to enhance the sweetness of any other sweet-tasting substance in the aroma composition, if present; and wherein at least one of the one or more taste modifiers is selected from:

phloretin;

hesperetin;

hesperetin dihydrochalcone;

naringenin;

phyllodulcin;

trilobatin;

hydrangenol;

hesperetin dihydrochalcone 4-O-glucoside; and phloretin in combination with at least one further taste modifier selected from the group consisting of naringenin, hesperetin, hesperetin dihydrochalcone, phyllodulcin, trilobatin, hydrangenol, and hesperetin dihydrochalcone 4-O-glucoside, and salts thereof.

2. The aroma composition of claim 1, wherein the R3 and the R4 are H or the R3 is —OH, the R4 is $—CH_3$, and the R5 is H, —OH, or —O-glucopyranoside.

3. The aroma composition of claim 1, wherein the one or more taste modifiers of the Formula (I) are selected from naringenin, phloretin, hesperetin, hesperetin dihydrochalcone, phyllodulcin, trilobatin, hydrangenol, and hesperetin dihydrochalcone 4-O-glucoside, and salts thereof.

4. The aroma composition of claim 3, wherein the aroma composition comprises the phloretin and the one or more additional taste modifiers of the Formula (I) selected from naringenin, hesperetin, hesperetin dihydrochalcone, phyllodulcin, trilobatin, hydrangenol, and hesperetin dihydrochalcone 4-O-glucoside, and salts thereof.

5. The aroma composition of claim 3, wherein the aroma composition comprises at least two of the one or more taste modifiers of the Formula (I), or salts thereof, wherein the at least two of the one or more taste modifiers are selected from:

phloretin and hesperetin, phloretin and hesperetin dihydrochalcone, hesperetin and hesperetin dihydrochalcone, phloretin and naringenin, naringenin and hesperetin, phloretin and phyllodulcin, hesperetin and phyllodulcin, hesperetin dihydrochalcone and naringenin, and hesperetin dihydrochalcone and phyllodulcin, and salts thereof.

6. The aroma composition of claim 3, wherein the aroma composition comprises at least three of the one or more taste modifiers of the Formula (I), or salts thereof, wherein the at least three taste modifiers are selected from:

phloretin, hesperetin, and naringenin,
phloretin, hesperetin, and hesperetin dihydrochalcone,
phloretin, naringenin, and hesperetin dihydrochalcone,
phloretin, phyllodulcin, and hesperetin dihydrochalcone,
hesperetin, phyllodulcin, and hesperetin dihydrochalcone,
phloretin, hesperetin, and phyllodulcin,
phloretin, naringenin, and phyllodulcin,
hesperetin, naringenin, and phyllodulcin,
phloretin, hesperetin, and trilobatin,
phloretin, naringenin, and trilobatin, and
hesperetin, naringenin, and trilobatin, and salts thereof.

7. The aroma composition of claim 1, wherein the one or more taste modifiers are present in a total amount of 0.5 to 100 ppm.

8. The aroma composition of claim 1, wherein the one or more taste modifiers are present in a total amount of 1 to 80 ppm.

9. The aroma composition of claim 1, wherein the one or more taste modifiers are present in a total amount of 1.5 to 60 ppm.

10. The aroma composition of claim 1, further comprising one or more compounds conveying a sour taste, one or more compounds conveying a sweet taste, or a combination thereof, provided the one or more taste modifiers of the Formula (I) are in an amount sufficient to improve sweet and sour balance, reduce sweet and sour imbalance, improve mouthfeel, or a combination thereof.

11. The aroma composition of claim 10, wherein the one or more compounds conveying the sour taste are selected from acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid; and the one or more compounds conveying the sweet taste are selected from natural sweeteners, synthetic sweeteners, sweet tasting carbohydrates, and sugar alcohols.

12. A method for improving sweet and sour balance of a preparation, reducing sweet and sour imbalance of a preparation, improving mouthfeel of a preparation, or a combination thereof, comprising:

(i) providing a preparation in need of improved sweet and sour balance, reduced sweet and sour imbalance, improved mouthfeel, or a combination thereof;
(ii) providing an aroma composition of claim;
(iii) mixing the preparation of (i) with the aroma composition of (ii):
(iv) optionally, further processing of the mixture obtained in (iii); and
(v) obtaining a composition with an improved sweet and sour balance, reduced sweet and sour imbalance, improved mouthfeel, or a combination thereof.

13. The method of claim 12, wherein the preparation comprises one or more compounds conveying a sour taste selected from acetic acid, adipic acid, aspartic acid, benzoic acid, sorbic acid, caffeotannic acid, citric acid, iso-citric acid, fumaric acid, galacturonic acid, gluconic acid, glucuronic acid, glyceric acid, glycolic acid, ketoglutaric acid, [alpha]-ketoglutaric acid, lactic acid, lactoisocitric acid, malic acid, maleic acid, oxalacetic acid, oxalic acid, phosphoric acid, pyruvic acid, quinic acid, shikimic acid, succinic acid, tannic acid, and tartaric acid.

14. The method of claim 12, wherein the preparation comprises one or more compounds conveying a sweet taste selected from natural sweeteners, synthetic sweeteners, sweet tasting carbohydrates, and sugar alcohols.

15. An aroma composition comprising two or more taste modifiers in an amount that:

(i) provides no sweetness impression or a sweetness impression of less than 1.5% sucrose equivalents to the aroma composition; and
(ii) is not sufficient to enhance sweetness of any other sweet-tasting substance in the aroma composition, if present;

wherein the two or more taste modifiers include:
(a) phloretin; and
(b) at least one taste modifier selected from naringenin, hesperetin, hesperetin dihydrochalcone, phyllodulcin, trilobatin, hydrangenol, hesperetin dihydrochalcone 4-O-glucoside, and salts thereof.

16. The aroma composition of claim 15, wherein the at least one taste modifier of (b) is selected from the naringenin, hesperetin, hesperetin dihydrochalcone, phyllodulcin, and salts thereof.

17. The aroma composition of claim 16, wherein the at least one taste modifier of (b) is selected from:

(i) the hesperetin;
(ii) the hesperetin dihydrochalcone; and
(iii) the phyllodulcin and naringenin.

18. An aroma composition comprising two or more taste modifiers in an amount that:

(i) provides no sweetness impression or a sweetness impression of less than 1.5% sucrose equivalents to the aroma composition; and
(ii) is not sufficient to enhance sweetness of any other sweet-tasting substance in the aroma composition, if present;

wherein the two or more taste modifiers include:
(a) hesperetin dihydrochalcone; and
(b) at least one taste modifier selected from naringenin, phloretin, hesperetin, phyllodulcin, trilobatin, hydrangenol, and hesperetin dihydrochalcone 4-O-glucoside, and salts thereof.

19. The aroma composition of claim 18, wherein the at least one taste modifier of (b) is the phloretin.

* * * * *